United States Patent [19]
Lane

[11] 4,204,112
[45] May 20, 1980

[54] BIDIRECTIONAL PRESETTABLE ODOMETER

[76] Inventor: Don W. Lane, 4501 Telephone Rd. #33, Houston, Tex. 77087

[21] Appl. No.: 873,084

[22] Filed: Jan. 27, 1978

[51] Int. Cl.² ............................................. G01C 22/00
[52] U.S. Cl. .............................. 235/95 R; 235/133 R
[58] Field of Search ............... 235/94 R, 95 R, 95 A, 235/95 B, 95 C, 96, 97, 103, 119, 133 R; 222/142.5

[56] References Cited
U.S. PATENT DOCUMENTS

| | | | |
|---|---|---|---|
| 3,129,599 | 4/1964 | Olson | 235/103 |
| 3,334,811 | 8/1967 | Sigl | 235/103 |
| 3,355,103 | 11/1967 | Lannerd | 235/103 |

Primary Examiner—L. T. Hix
Assistant Examiner—Benjamin R. Fuller
Attorney, Agent, or Firm—Donald Gunn

[57] ABSTRACT

A bidirectional odometer having preset features is disclosed. It further includes means for scaling the rate of counting. It incorporates a set of three, four, five or six decade gears of counting gears having numeric indicators thereon and a variable input. The gears are locked together in a sequential chain. The chain can be broken by moving retractable idlers which are moved away to permit repositioning. The device further includes an adjustment controllably locating a multiplier on positive or negative sides of a lead screw to obtain ascending or descending counting. It further incorporates a power take-off drive for rotation of the gear chain from a speedometer cable or the like.

8 Claims, 5 Drawing Figures

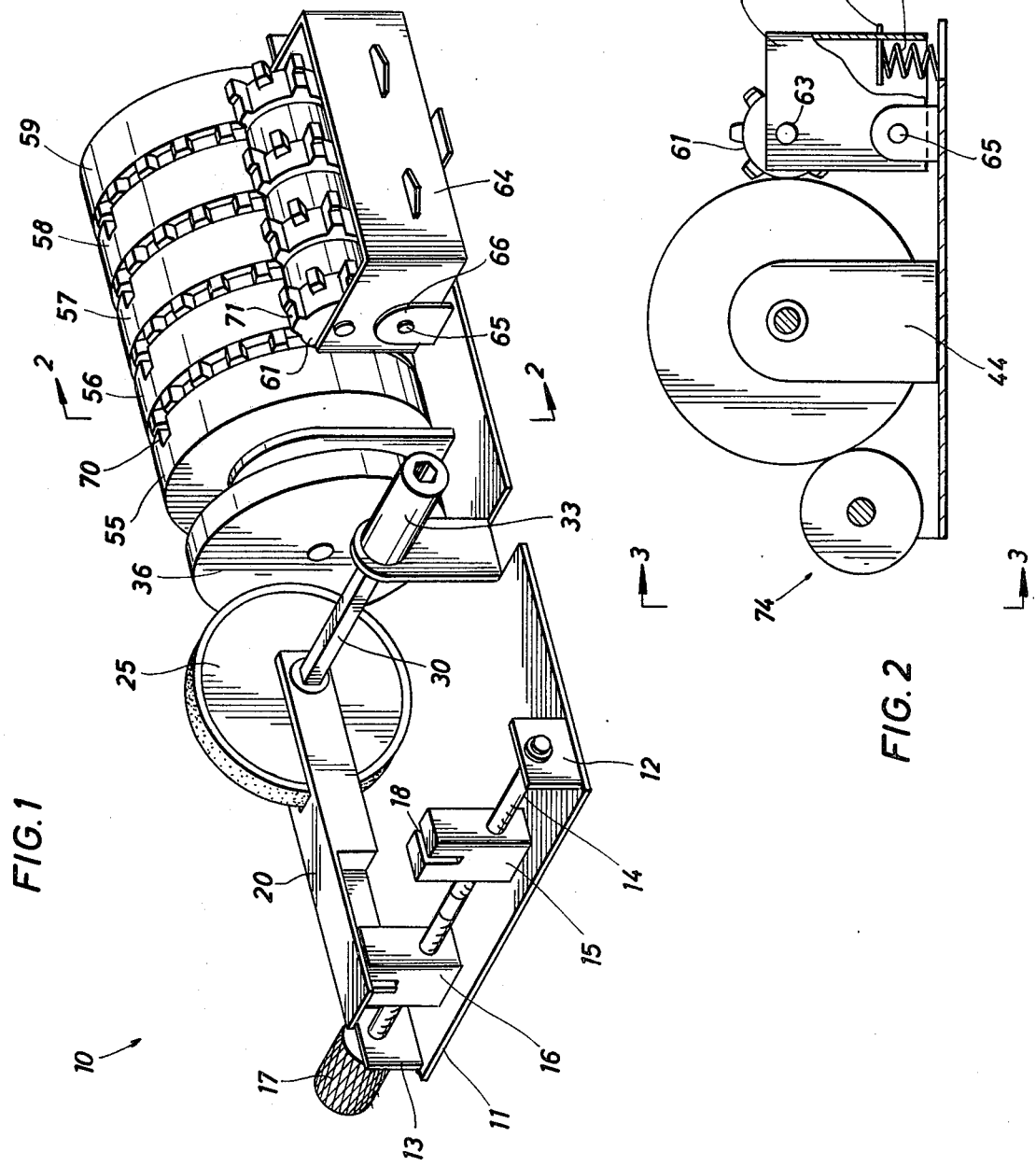

BIDIRECTIONAL PRESETTABLE ODOMETER

BACKGROUND OF THE DISCLOSURE

This apparatus is directed to an adjustable and presettable odometer which counts in ascending or descending order. In driving the highways of this country, one will often notice the mileage posts which are adjacent to the side of the highway for indicating the mileage from a point of entry on the highway to some point where the highway either begins or terminates. Such an arrangement is of great benefit to a traveler. However, a traveler normally does not utilize these mileage markers fully because his path of travel will not precisely coincide with the locus of the mileage markers. For instance, a given highway may have upwards of one thousand miles measured and marked with individual mileage markers, while the traveler may use only 238 miles of that highway. Moreover, the traveler may be on the highway on a given date, traveling where the markers are in ascending order, and, on his return trip, the markers will then read in descending order. The traveler is thus required to exercise certain arithmetic conversions by adding in or subtracting out base numbers to convert the mileage marker system to conform with his specific needs and requirements. Sometimes, the arithmetic is conveniently easy, but, more often than not, it is not so easy that it can be done in the head of a person viewing the mileage markers, and, quite often, no benefit whatsoever is obtained from the mileage markers.

The present invention is an apparatus which more readily utilizes the mileage markers. It is an odometer which can be set to match mileage markers. Moreover, it accommodates mileage markers or kilometer posts, also. It should be recognized that most highways are presently marked in mileage utilizing the English set of units, but this is probably going to change in the near future so that many highways will be marked in kilometers. Indeed, the advent of the metric system in this country is a foregone conclusion; it is the awkward, in-between time when the difficulties arise with converting back and forth between English and metric units. The present invention is an odometer which can measure distances in English or metric units. The apparatus accomplishes scale conversion so that the output can read in any arbitrary type of unit desired. Accordingly, the present invention yields an odometer which is presettable to any specific number. It is able to count up or down towards any other number. It can count by any scale measure so that it will accommodate both metric or English units of measure. Lastly, it is a portable, removable device to be used with any vehicle desired.

BRIEF DESCRIPTION OF THE DISCLOSED EMBODIMENT

The present invention is disclosed as incorporating a base plate for mounting of certain equipment thereon. It incorporates a threaded lead screw having threads of opposite hand at opposite ends thereof. The lead screw carries traveling nuts on it. It is rotated to implement a change in scale. It adjusts a follower, and the follower, in turn, moves a drum. The drum, itself, is mounted on a shaft so that the two rotate together, and the shaft is, in turn, provided with a fitting. The fitting is a power input point for connection to any kind of rotating drive shaft which is proportionate to vehicle speed in the same fashion as speedometers operate.

The rotating drum is friction engaged with a follower, and it rotates the follower in proportion to the rate of rotation of the speedometer drive shaft and the setting implemented through the lead screw. The sign or polarity is adjusted at the lead screw by use of positive and negative traveling nuts mounted on it. The driven drum is connected to incrementally advanced decade drive gears having two, three, four or more decades, and they are, in turn, connected together through suitable idler gears. All of the idlers as a unit can be disengaged so that the gears can be reset to achieve a selected beginning point.

BRIEF DESCRIPTION OF THE DRAWINGS

FIG. 1 is a perspective view showing the odometer of the present invention;

FIG. 2 is a sectional view along the line 2—2 of FIG. 1 showing details of construction of the odometer gears, idlers and their mounting;

DETAILED DESCRIPTION OF THE ILLUSTRATED EMBODIMENT

Figure 3:
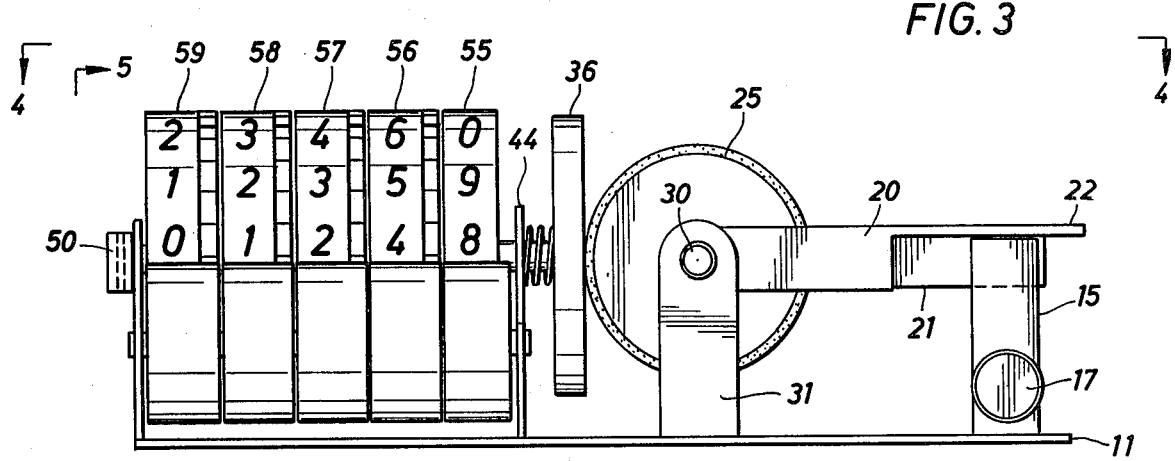
FIG. 3 is a side view of the apparatus shown in FIG. 2 showing a gear drive system having an adjustable power input for rotation and a specified number of decades.

In the drawings, the odometer of the present invention is identified by the numeral 10. As shown in FIG. 1, it incorporates a base plate 11 which supports the apparatus of interest. Beginning at the lefthand end of the apparatus, two upstanding tabs 12 and 13 support an elongate lead screw 14. The screw 14 is threaded in one direction at one end and is threaded in the opposite direction at the other end. The lead screw 14 positions two traveling nuts identified by the numerals 15 and 16. The traveling nuts 15 and 16 are moved toward or away from one another. The screw 14 is locked by an end washer in at the tab 12 and, thus, is free to rotate. A knob 17 is incorporated at the opposite end for rotation of the shaft. The knob 17, when rotated, adjusts a scale factor, as will be described.

The traveling nuts 15 and 16 are identical in construction and are preferably located at identical distances from the centerpoint. There is a center or neutral point on the lead screw 14 where no advance can be achieved. This corresponds to multiplication by zero, as will be described. Away from that point, the traveling nuts 15 and 16, moving on top of the base plate 11, implement differing and larger scale factors, one providing a positive value and the other providing a negative value. This helps the equipment to count up or down as required. The traveling nuts 15 and 16 are each provided with slots or grooves 18 on the top face. The slots or grooves serve as alignment means for a follower mechanism. This will be discussed in detail hereinafter. As shown in FIG. 3 of the drawings, the traveling nuts extend fairly tall above the base plate 11, and, coupled with the slot mentioned above, they enable a follower to be aligned with the selected traveling nut. The follower includes a narrow, thin spline 21 on an elongate frame member 20. The frame member 20 is generally rectangular in construction, incorporating the narrow edge 21 on the bottom side at one end. A protruding, overhanging lip 22 serves as a hand hold so that the follower can be positioned by engaging or disengaging it with the slot or the groove in the traveling nuts 15 and 16. The frame member 20 is elongate and functions as a lever to couple motion between components.

Figure 4:
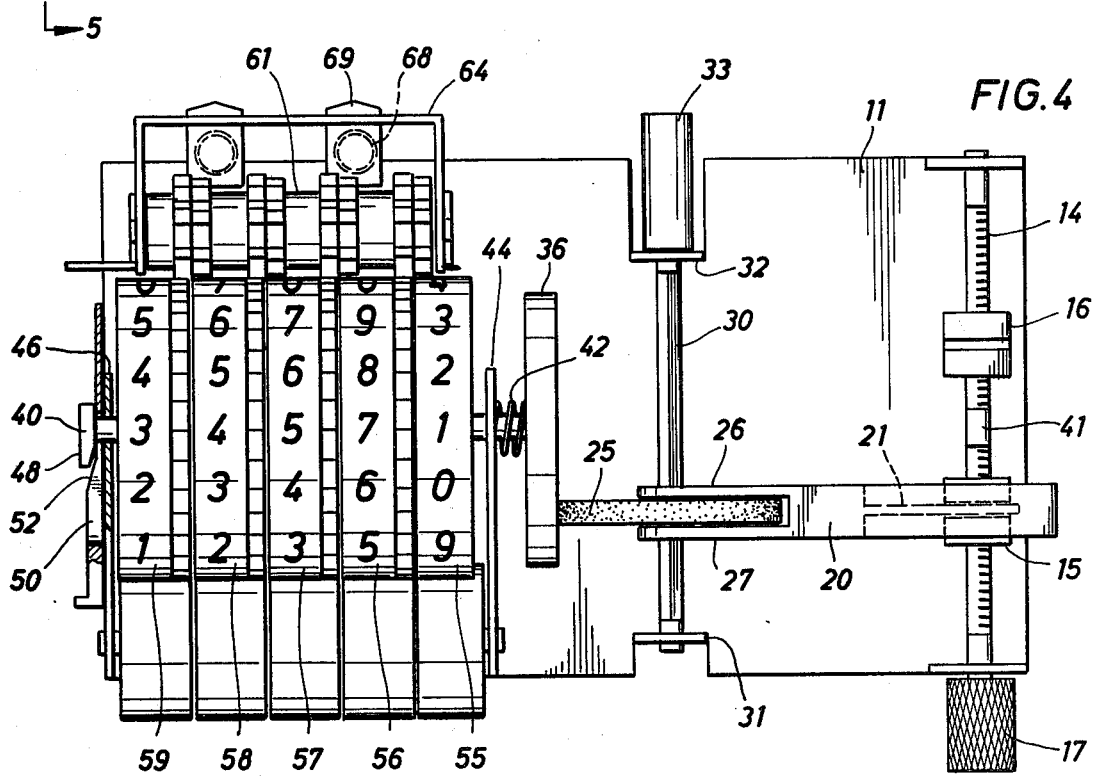
FIG. 4 is a top view of the apparatus shown in FIG. 3 showing additional details of the multiplication means at the input whereby scale factors are implemented.
Figure 5:
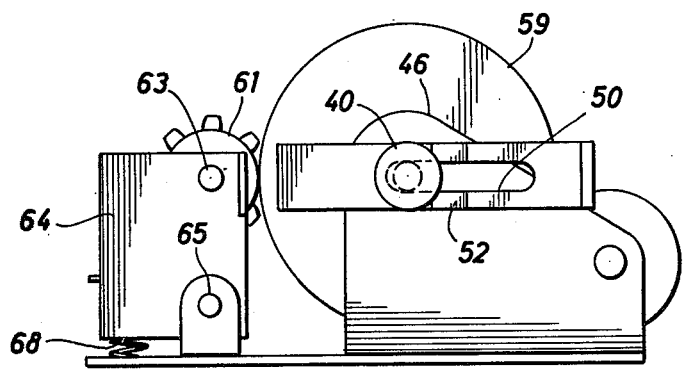
FIG. 5 is an end view of the apparatus shown in FIG. 3 showing details of construction including a movable shaft for the decade gears whereby resetting is achieved.

The elongate member 20 is split at the lefthand end so as to encompass a rotated drive wheel 25, better shown in FIG. 4. There, the follower is shown to be divided into two parts at 26 and 27. They bracket the driven wheel or drum 25.

A nonround shaft 30 passes through the wheel or drum 25. The drum 25 is keyed to the shaft 30. The shaft 30 is nonround so that when it rotates, it carries the drum with it. The drum 25 must rotate at the same speed as the shaft 30. It will be observed that the drum 25 can move from one end to the other of the shaft. The fact that it is free to move between the ends is used in a manner to be described. The frame member 20 has bushings in it which are shaped to the shaft 30 and which are round on the exterior so that the elongate frame member 20 can rotate around the shaft 30, but it is not rotated. The follower is thus free to be opened or closed as desired. It is hand-lifted, as shown in FIG. 3, to raise the shift lever away from one of the traveling nuts.

The drum 25 is slidably mounted on the shaft so it can be pushed from one end to the other. The shaft 25 is supported by an upstanding, vertical tab member 31 shown in FIG. 4, and a similar tab 32 is at the opposite end. The two tabs are perforated and receive suitable support bushings for the shaft. The shaft 30 additionally supports a hollow socket 33 for receiving a drive mechanism therein. The socket 33 at the end of the shaft 30 is adapted to receive and temporarily connect to the tip of a speedometer drive cable. Typically, a speedometer drive cable includes a flexible, shielded, outer, nonrotatable sheath member and an internal wire which is rotated. At the end, the wire connects with an enlargement, such as a threaded fitting or the like. In this instance, the rotatable wire is shaped into a suitable form for plugging into the socket so that the socket is rotated. This is accomplished with no slippage, thereby imparting rotation to the socket 33 and the appended shaft 30. This then rotates the mounting shaft 30 and the drum 25 which is carried on it.

On viewing the apparatus in FIG. 4, the driven drum 25 has an outer periphery which is a friction surface which friction-engages a driven drum 36. The drum 36 is rotated. It is rotated by frictional engagement. As will be observed from the top view of FIG. 4, the driven drum 36 is mounted on a shaft 40. The shaft 40 defines the centerline. As shown in FIG. 3, contact against the drum 36 is at the centerline only when the driving drum 25 is aligned with the shaft 40. It will be observed that the lead screw 14 is provided with a blank portion at 41. It is not possible to position a traveling nut at the space 41. If this were accomplished, this would result in positioning the drum 25 where it would contact the driven drum 36 precisely at its center, and no rotation would be imparted. As long as the point of contact is to the right or to the left of the shaft 40 as shown in FIG. 4, rotation is imparted. This is assured by the incorporation of a coil spring 42 which forces the drum 36 against the driving drum 25. The coil spring is captured against the upstanding wall 44 which aligns the shaft 40. The upstanding wall 44 serves as a mounting plate for the equipment to be described.

The shaft 40 is rotated via the driven drum 36. The shaft 40 is mounted on a similar end plate 46, better shown in FIG. 4 of the drawings. The plate 46 is parallel to the plate 44, and the two plates together position and hold the shaft 40 at the required location.

The shaft 40 includes an enlarged head 48. The head is received through an opening in a shift lever 50. The shift lever 50 has an elongate slot which passes around the shaft 40 to capture the shaft. The shift lever 50 includes a tapered face portion 52 which contacts the enlargment 48 and forces the shaft to the left as viewed in FIG. 4. When this occurs, the drums 25 and 36 are disengaged from one another. Sliding movement of the slidable shift lever 50 thus axially moves the shaft 40, controlling frictional engagement. The shift lever 50 thus functions somewhat as a shift lever throwing the device into and out of gear. It disconnects the power source.

The shaft 40 supports multiple decade gears. Only one is required at a minimum; preferably, four or five are incorporated. They operate in the following manner. The gear nearest the drum 36 rotates the most. The gear immediately adjacent to it rotates one-tenth as much. So to speak, the first gear counts in tenths of units, typically 0.10 miles per indication. This gear is identified by the numeral 55. The gear 56 counts units, a rate ten times greater than that of the gear 55. The gear 57 rotates one-tenth as fast and thereby counts tens of units, while the gear 58 counts hundreds of units. The last gear 59 counts by thousands.

The gears are driven so that rotation is transferred from the gear 55 to the gear 56. Such rotational transfer is achieved through an idler gear 61. The idler gear 61 is better shown in FIG. 1 of the drawings. There, the idler gear 61 is located at the lefthand end of a shaft 63 on which is mounted several idler gears. The number of idlers is one less than the number of gears in the decade progression. The counter thus includes five decade gears. This necessitates the use of four idler gears between the decade gears. The idlers are preferably identical to one another because they count down by the same ratio, that is, ten revolutions at the input provide one revolution at the output. The several idler gears 61 are thus supported on a shaft 63 which, in turn, is supported at opposite ends by a generally U-shaped housing 64. The housing 64 provides a fixed mount for the shaft 63. The housing itself is rotatably mounted by its location on a pair of protruding shafts 65 received on tabs 66. The upstanding tabs 66 are aligned with one another, there being one at each end of the U-shaped housing 64. The idler gears are forced against the decade gears by a coil spring 68, better shown in FIG. 2. The coil spring is mounted on the base plate 11. It forces upwardly against a tab 69, and the tab transfers the force of the spring to the U-shaped housing, thereby rotating the idler gears into operational contact.

The idler gears are disconnected in the following manner. Through the application of simple thumb pressure, the U-shaped housing 64 is forced downwardly, all as viewed in FIG. 2 of the drawings, and the entire apparatus rotates around the mounting post 65. This pulls the idler gears away from engagement and lets the decade gears rotate without regard to the position of adjacent decade gears. They can all be adjusted individually to input any number required. When the spring 68 is released, it forces all the idler gears back into position.

The idler gears achieve alignment because there is a notch 70 in each gear (see FIG. 1) which aligns with an enlarged tooth 71 on each idler gear. These are used for alignment purposes only. This prevents the idler gear from meshing incorrectly. Incorrect meshing is thus avoided, and, thereby, the large tooth 71 will fall into the large notch 70 immediately adjacent to the teeth on the decade gear. Each decade gear is provided with its own. It will be appreciated that there are N decade gears (where N is a whole number integer), and the number of idler gears is N−1. It is necessary to make only N−1 rotational transfers between the N decade gears.

As shown in FIG. 2 of the drawings, the idlers are located on one side of the decade gears. A roller system at 74 is located on the opposite side. They bear against the decade gears from the opposite side. This is a means for keeping all the gears in alignment. The lateral forces applied by the rollers 74 are applied equally to all of the gears. As shown in FIG. 3 of the drawings, they can also be used to delineate a reference line so that the user can read the numbers as shown in FIG. 3. Alternately, an opaque, plastic shield can be placed over all the decade gears with notches left clear to show one number from each decade gear. For the description of the apparatus, it is best to describe it uncovered so that the parts and their interrelationship can be understood on viewing the drawings.

In operation, the device functions in the following manner. The connector 33 is attached to a speedometer drive cable of some form or fashion. It is presumed that the speedometer cable rotates at a speed which is proportionate to the speed of the vehicle in question. After this connection is made, the following adjustments are then implemented. First of all, it is determined whether or not the device is going to count in descending or ascending order. Once this determination is made, one of the two traveling blocks is selected. Reference is made to the lead screw 14 and the traveling blocks which are mounted on it. The shift lever 20 is in position on the one which is required. It will be understood that one counts in the positive direction, and the other causes counting in the negative direction.

The next step is to calibrate the device so that it is proportionate to some unit of measure, such as kilometers or miles. This is achieved by rotating the control knob 17. If the device is counting at too rapid a rate, it is rotated to bring the traveling nuts toward one another. This movement is achieved by hand rotation of the knurled knob 17 on the end of the lead screw 14. Such rotation is easily accomplished to reposition the traveling nuts closer to one another.

Two or three tries are made on this. As soon as an indication is achieved by visual observation that the device is counting at the same rate as the unit of measure in question, the lead screw is then left in its position, and the next adjustment is then made. At this point, the device counts at the same rate, and it counts in the selected ascending or descending sequence required for its operation. Next, the device is zeroed. Zeroing may require readjustment of the decade wheels to zero value. It may require adjustment to some other value. Without regard to the particular value, the housing 64 is forced downwardly to disengage the idlers, and the gears are then hand rotated, one at a time, until they achieve a specified beginning value. The spring 68, once depressed, is then released so that the idlers are pushed back into meshing relationship. Once the idlers have been released, they restore the connective relationship between adjacent decade gears. Thus, the gear 56 then drives the gear 57, while the gear 57 drives the next gear 58 and so on. This sequence chains from the least significant to the most significant gear.

At this juncture, the device is then functioning correctly. It will count up or down in units which are proportionate to a selected standard. As it counts, it can be used as a trip meter to indicate total mileage elapsed or mileage yet to be achieved, depending on how the device is used.

In summary, the device incorporates the following three adjustments. It is adjustable to count in ascending or descending order as selected. It accommodates any scale and can be adjusted from one scale to another by altering the position of the traveling nuts on the lead screw. Thirdly, it can be set to any beginning value desired.

The device can be used time after time by making the adjustments mentioned above. After the beginning adjustments are made, the device operates substantially without attention other than to observe the settings or readings obtained by the device.

The foregoing is directed to the preferred embodiment, but the scope of the present invention is determined by the claims which follow.

I claim:
1. Apparatus which functions as a trip measuring device cooperative with a speedometer cable which rotates at a speed proportionate to vehicle speed which comprises:
   (a) a supportive framework for the apparatus;
   (b) input means supported by said framework which input means is adapted to be rotated by a speedometer cable at a speed proportionate to vehicle speed;
   (c) multiplying means connected to said input means for multiplying the input rotation received at said input means by a scale factor input to said multiplying means, said multiplying means adjustable between specified minimum and maximum scale factors;
   (d) a multi-decade indicator means driven by said multiplying means, said indicator means being selectively adjustable to a desired beginning value visually indicated by said indicator means; and
   (e) control means for controllably operating said indicator means to increment in ascending or descending order as required by rotation of the speedometer cable to said input means which control means comprises a drive system operatively connected between said multiplying means and said indicator means wherein positive and negative scale factors input to said multiplying means are implemented by variably positioning a driven member relative to a driving member to selectively achieve rotational reversal of the driven member dependent on the polarity of the scale factor.

2. The apparatus of claim 1 wherein said driving and driven members are at right angles and are frictionally engaged and wherein one is movable to alter the frictional contact point to vary the relative ratio therebetween.

3. The apparatus of claim 1 wherein said indicator means includes at least two decade gears, one of which is connected to an adjacent decade gear via an idler gear having a ratio of 1:10 wherein said idler gear is selectively disengagable to permit readjustment of the decade gears relative to one another.

4. The apparatus of claim 3 wherein said decade gears are supported along a common axis on a shaft which supports and rotates the least significant of said decade gears and which shaft supports the next least significant decade gear driven by said connecting idler gear therebetween and wherein said idler gear incorporates a marker tooth shaped differently so that said marker tooth can be meshed only in a selected manner with said decade gears.

5. The apparatus of claim 4 including a shaft supporting said connecting idler gear, said shaft being supported by a movable mounting means which enables selective disengagement of said idler gear from said decade gears.

6. The apparatus of claim 5 including resilient means urging said shaft and idler gear toward said decade gears to achieve engagement.

7. The apparatus of claim 6 including N−1 idler gears supported on said shaft where N equals the number of decade gears.

8. Apparatus which functions as a trip measuring device cooperative with a speedometer cable which rotates at a speed proportionate to vehicle speed which comprises:

(a) a supportive framework for the apparatus;

(b) input means supported thereon which is adapted to be rotated by a speedometer cable at a speed proportionate to vehicle speed;

(c) means for multiplying the input rotation received at said input means by a scale factor to impose an arbitrary scale factor thereon, said multiplying means adjustable between specified minimum and maximum scale factors;

(d) a multi-decade indicator means driven by said multiplying means, said indicator means being selectively adjustable to a desired beginning value visually indicated to an observer by said indicator means;

(e) means for controllably operating said indicator means to increment in ascending or descending order as required by rotation of the speedmeter cable to said input means; and (f) wherein said multiplying means includes
  (1) an elongate lead screw having sets of threads on opposite ends thereof with opposite handed rotation;
  (2) a traveling nut movable along said lead screw on rotation of said lead screw; and
  (3) means carried by said lead screw to support and position a movable and rotatable driving drum rotated by said input means.

* * * * *